(12) United States Patent
Shin

(10) Patent No.: US 7,438,145 B2
(45) Date of Patent: Oct. 21, 2008

(54) VEHICLE ADAPTABLE TO VARIOUS TERRAINS

(76) Inventor: Wen-Chyan Shin, No. 39, Renmei Road, Taichung County 412, Dali (TW)

( * ) Notice: Subject to any disclaimer, the term of this patent is extended or adjusted under 35 U.S.C. 154(b) by 384 days.

(21) Appl. No.: 11/163,970

(22) Filed: Nov. 4, 2005

(65) Prior Publication Data
US 2007/0017716 A1    Jan. 25, 2007

(30) Foreign Application Priority Data
Jul. 19, 2005    (TW) .............................. 94124364 A

(51) Int. Cl.
*B60K 1/00*    (2006.01)
(52) U.S. Cl. ..................... 180/65.1; 180/65.6; 280/5.22; 280/5.26; 280/755
(58) Field of Classification Search ................ 180/65.6; 280/755
See application file for complete search history.

(56) References Cited

U.S. PATENT DOCUMENTS

| | | | | |
|---|---|---|---|---|
| 5,944,131 A | * | 8/1999 | Schaffner et al. ........... | 180/65.1 |
| 6,199,647 B1 | * | 3/2001 | Schaffner et al. ........... | 180/65.1 |
| 6,234,507 B1 | * | 5/2001 | Dickie et al. .............. | 280/304.1 |
| 7,040,429 B2 | * | 5/2006 | Molnar ....................... | 180/65.1 |
| 7,207,403 B2 | * | 4/2007 | Grymko et al. ............. | 180/65.1 |
| 7,222,881 B1 | * | 5/2007 | Zhou .......................... | 280/755 |
| 7,234,554 B2 | * | 6/2007 | Mulhern et al. ............. | 180/65.6 |
| 7,264,272 B2 | * | 9/2007 | Mulhern et al. ............. | 280/755 |
| 2001/0011613 A1 | * | 8/2001 | Schaffner et al. ........... | 180/65.1 |
| 2003/0168265 A1 | * | 9/2003 | Goertzen et al. ............ | 180/65.1 |
| 2004/0188152 A1 | * | 9/2004 | Schaffner ................... | 180/65.1 |
| 2006/0249317 A1 | * | 11/2006 | Fought ....................... | 180/65.1 |

* cited by examiner

*Primary Examiner*—Lesley D. Morris
*Assistant Examiner*—Tashiana Adams
(74) *Attorney, Agent, or Firm*—Alan Kamrath; Kamrath & Associates PA

(57) ABSTRACT

A vehicle is adaptable to various terrains. The vehicle includes a frame and two rolling sets connected to the frame. Each of the rolling sets includes two legs pivotally connected to the frame, two casters, a pin and a wheel. Each of the legs defines a slot. Each of the casters is connected to one of the legs. The pin is carried by the frame and extends through the slots so that the motor is moved when the legs are pivoted. The wheel is operably connected to the motor so that the casters and the wheel always grip the ground firmly regardless of whether the casters are up or down.

12 Claims, 7 Drawing Sheets

VEHICLE ADAPTABLE TO VARIOUS TERRAINS

BACKGROUND OF INVENTION

1. Field of Invention

The present invention relates to vehicles and, more particularly, to a vehicle adaptable to various terrains.

2. Related Prior Art

Various vehicles have been devised for diversified purposes such as transportation and recreation. The vehicles have become indispensable tools in modern societies.

However, driven on slopes, stairs or bumpy terrains or in short turns, most vehicles, if not all, have their centers of gravity lifted and in worst cases turn over. Some vehicles perform well on slopes, stairs or bumpy terrains. These vehicles generally include high profiles based on big wheels and high chassis. However, the high profiles mean heel or list in short turns. Some other vehicles perform well in short turns. These vehicles generally include low profiles based on low chassis. However, the low profiles mean bumping along the slopes, stairs or bumpy terrains.

The need for a vehicle that performs well in various conditions has not been satisfied. The present invention is intended to obviate or at least alleviate the problems encountered in the prior art.

SUMMARY OF INVENTION

According to the present invention, a vehicle is adaptable to various terrains. The vehicle includes a frame and two rolling sets connected to the frame. Each of the rolling sets includes two legs pivotally connected to the frame, two casters, a pin and a wheel. Each of the legs defines a slot. Each of the casters is connected to one of the legs. The pin is carried by the frame and extends through the slots so that the motor is moved when the legs are pivoted. The wheel is operably connected to the motor so that the wheel always grips the ground regardless of whether the casters are up or down.

The primary advantage of the vehicle of the present invention is that the casters and the wheel always grip the ground firmly regardless of whether the casters are up or down.

Other advantages and features of the present invention will become more apparent from the detailed description referring to the drawings.

BRIEF DESCRIPTION OF DRAWINGS

The present invention will be described via detailed illustration of the preferred embodiment referring to the drawings.

DETAILED DESCRIPTION OF PREFERRED EMBODIMENT

Figure 1:
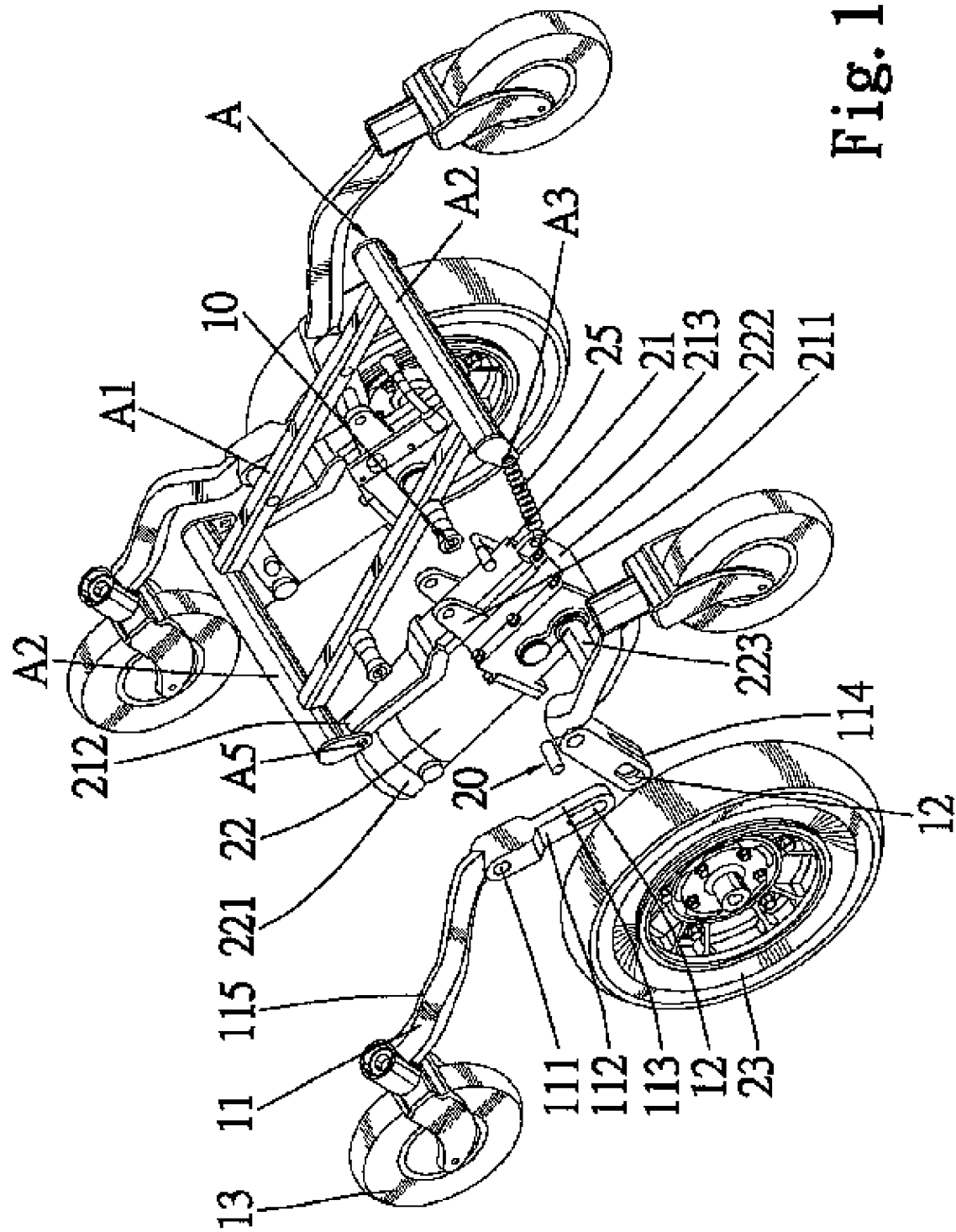
FIG. 1 is an exploded view of a vehicle adjustable to various terrains according to the preferred embodiment of the present invention.
Figure 2:
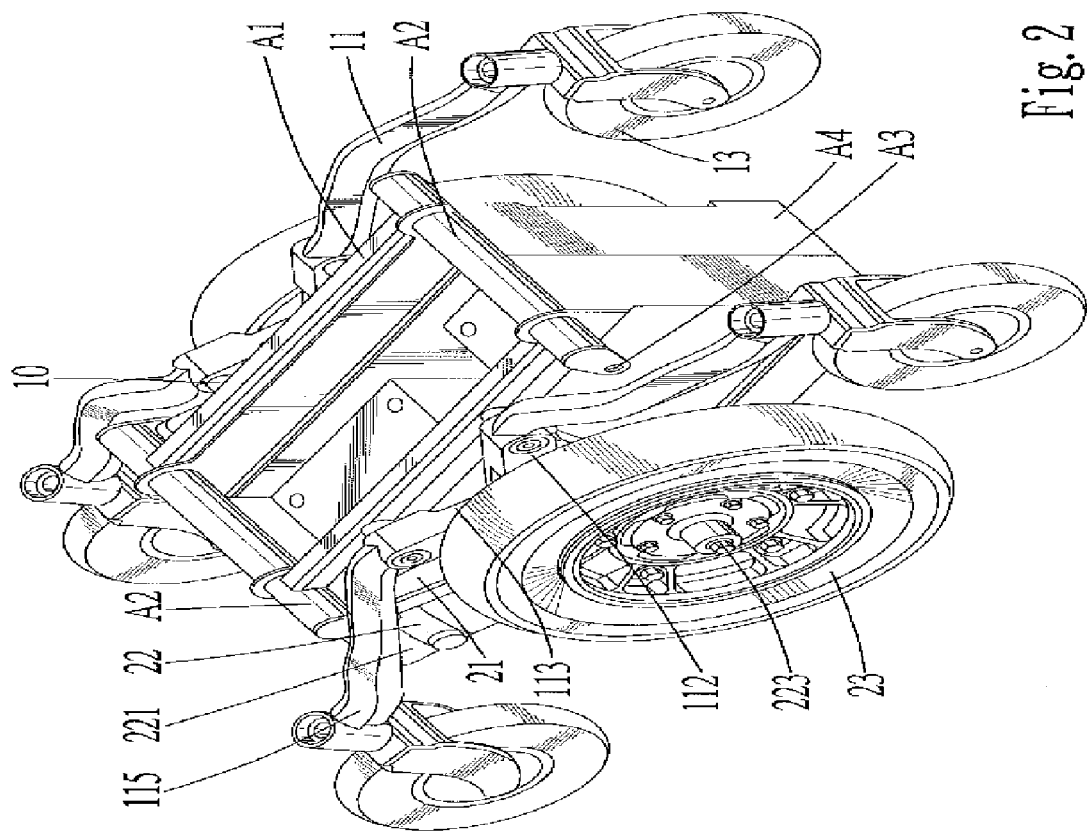
FIG. 2 is a perspective view of the vehicle shown in FIG. 1.
Figure 3:
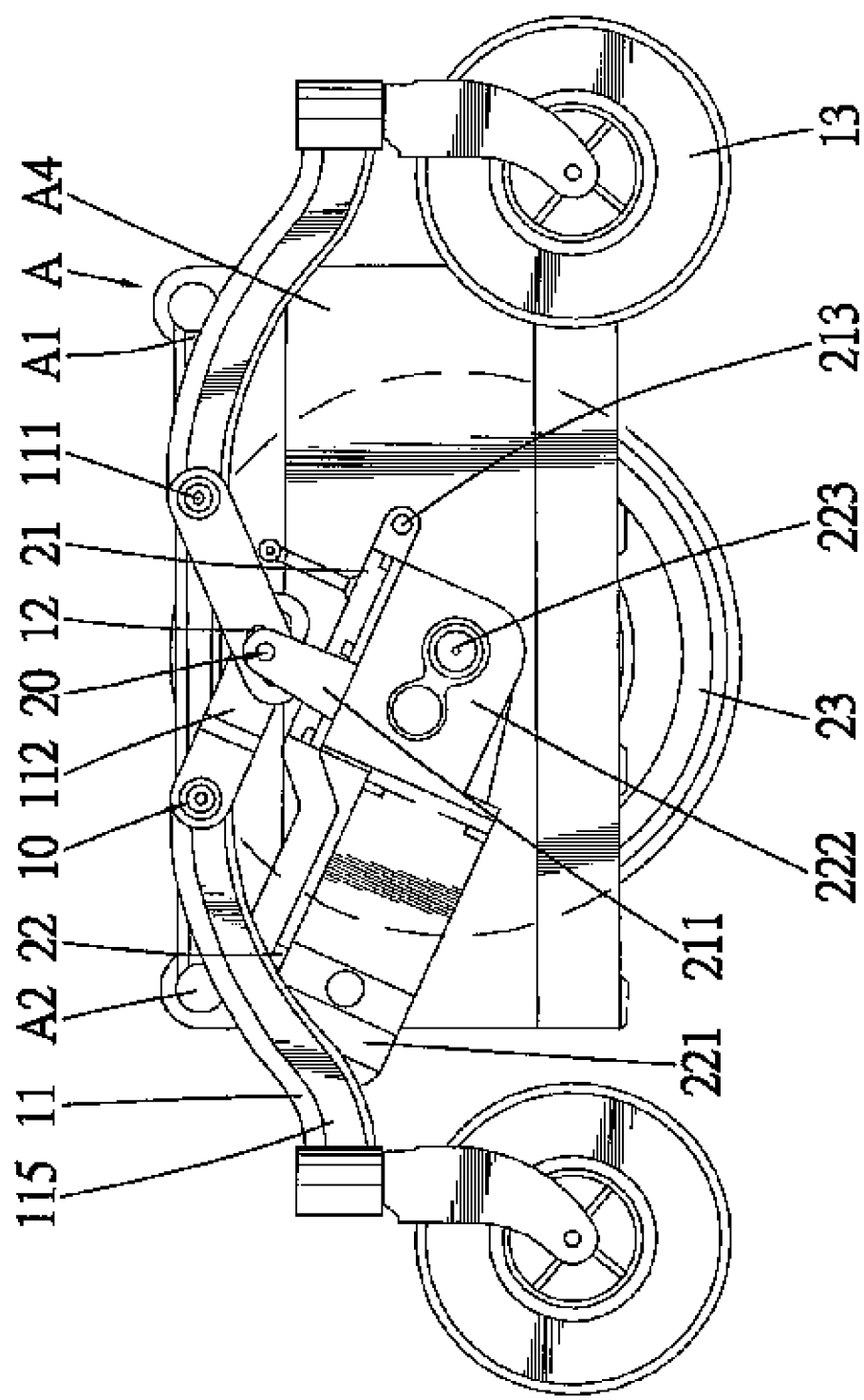
FIG. 3 is a side view of the vehicle shown in FIG. 2.

FIGS. 1 through 3 show a vehicle adaptable to various terrains according to the preferred embodiment of the present invention. The vehicle includes a frame A and two rolling sets each installed on a side of the frame A.

The frame A includes two longitudinal bars A1, two crossbars A2 and a box A4. Each of the longitudinal bars A1 is formed with two pivots 10. A lug A3 is formed at each of the ends of one of the crossbars A2. Two lugs A5 are formed at each of the ends of the other crossbar A2. A seat or any other proper carriage can be installed on the frame A in order to carry personnel or goods. At least one battery can be put in the box A4.

Each of the rolling sets includes a support 21 pivotally connected to one of the crossbars A2, a motor 22 securely connected to the support 21, two legs 11 pivotally connected to the support 21, a caster 13 connected to each of the legs 11, and a wheel 23 operably connected to the motor 22.

The support 21 includes a pair of lugs 211 on the top, a lug 212 at an end and a lug 213 at an opposite end. The lug 212 is put between a pair of lugs A5. A pin (not shown) is fit in the lugs 212 and A5 so that the support 21 is pivotally connected to one of the crossbars A2. A spring 25 hooks the lug 21 3 at an end and hooks the lug A3 at an opposite end.

The motor 22 includes a power chamber 221, a transmission 222 operably connected to the power chamber 221 and an axle 223 operably connected to the transmission 222. The wheel 23 is connected to the axle 223. The motor 22 may be an electrical motor, an engine, a turbine or any proper power device.

Each of the legs 11 includes a bent configuration consisting of a short section 112 and a long section 115. An aperture 111 is defined in each of the legs 11 between the sections 112 and 115. The short section 112 of one of the legs 11 is formed with a lug 113. The short section 112 of the other leg 11 is formed with a pair of lugs 114. A slot 12 is defined in each of the lugs 113 and 114.

Each of the pivots 10 is fit in the aperture 111 of one of the legs 11 so that the legs 11 are pivotally connected to the frame A. The lug 113 is put between the lugs 114 that are put in the lugs 211. A pin 20 is fit in the lugs 211, 114 and 113. Because of the slots 12, the legs 11 can be pivoted relative to the frame A.

The operation and adaptation of the vehicle to various terrains will be described with reference to FIGS. 4 through 7. The description will be based on only one of the rolling sets.

Figure 4:
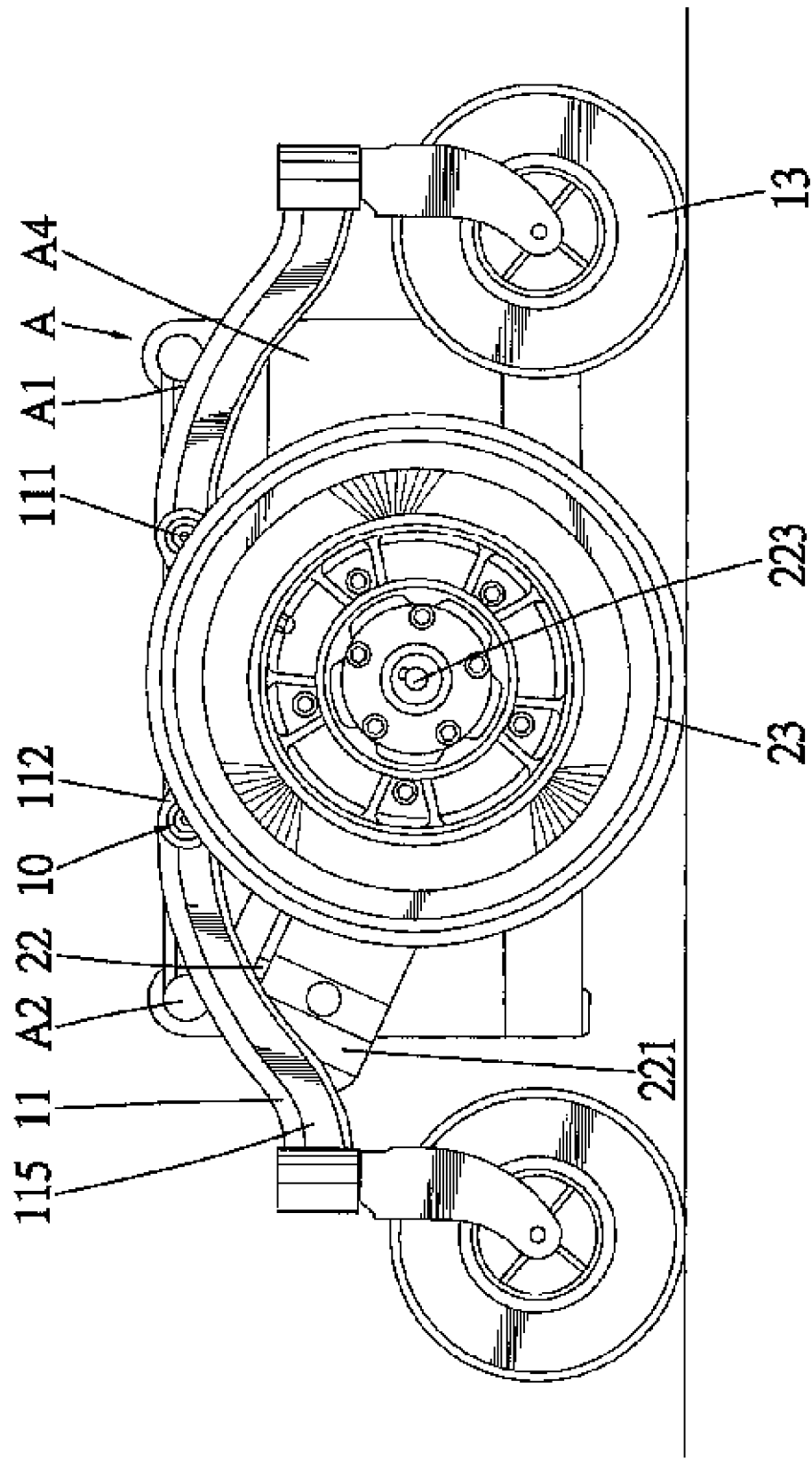
FIG. 4 is a side view of the vehicle shown in FIG. 3 on a plain surface.

Referring to FIG. 4, the vehicle goes on a plain surface. The weight of the vehicle is mainly carried on the wheel 23. The axle 223 lifts the pin 20 and therefore the short sections 112 of the legs 11. Thus, the long sections 115 of the legs 11 are lowered so that the casters 13 are lowered onto the plain surface. The lower portions of the wheel 23 and the casters 13 are in a line. The heavier a load is on the frame A, the tighter the wheel 23 and the casters 13 contact the plain surface.

Figure 5:
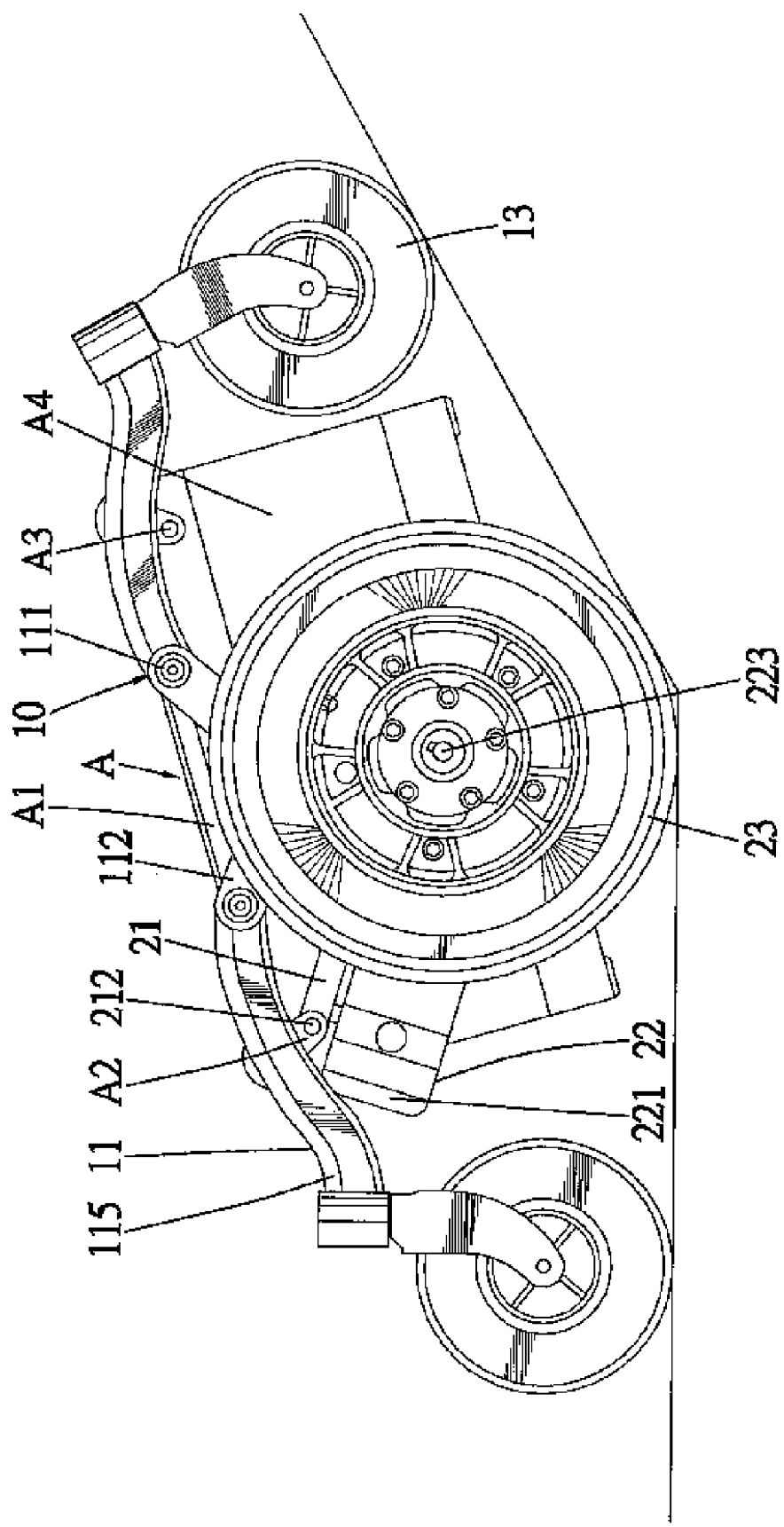
FIG. 5 is a side view of the vehicle shown in FIG. 4 up a slope.

Referring to FIG. 5, the vehicle goes up a slope from the plain surface. The weight of the vehicle is mainly carried on the wheel 23 and the rear caster 13. As the front leg 11 is pivotally connected to the frame A, the front caster 13 goes up the slope when driven by the wheel 23, and the lifting of the front caster 13 will not entail the lifting of the wheel 23. The wheel 23 maintains its grip of the plain surface. The tilting of the vehicle is encountered by the rear caster 13 so that the vehicle will not tumble.

Figure 6:
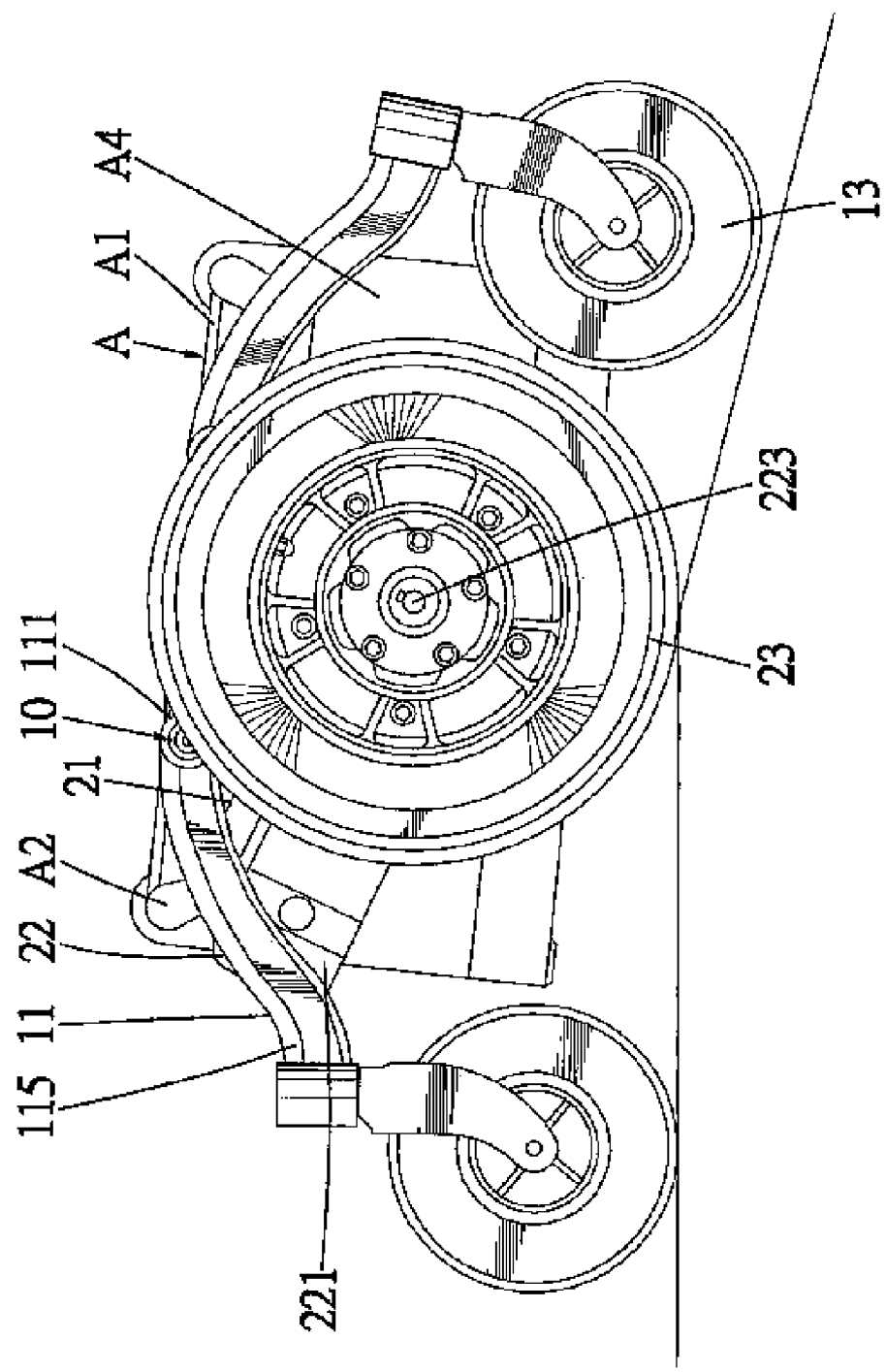
FIG. 6 is a side view of the vehicle shown in FIG. 4 down a slope.

Referring to FIG. 6, the vehicle goes down a slope from the plain surface. The weight of the vehicle is mainly carried on the wheel 23 and the front caster 13. As the front leg 11 is pivotally connected to the frame A, the front caster 13 goes down the slope when driven by the wheel 23, and the lowering of the front caster 13 will not entail the lowering of the wheel 23. The wheel 23 maintains its grip of the plain surface. The tilting of the vehicle is encountered by the front caster 13 so that the vehicle will not tumble.

Figure 7:
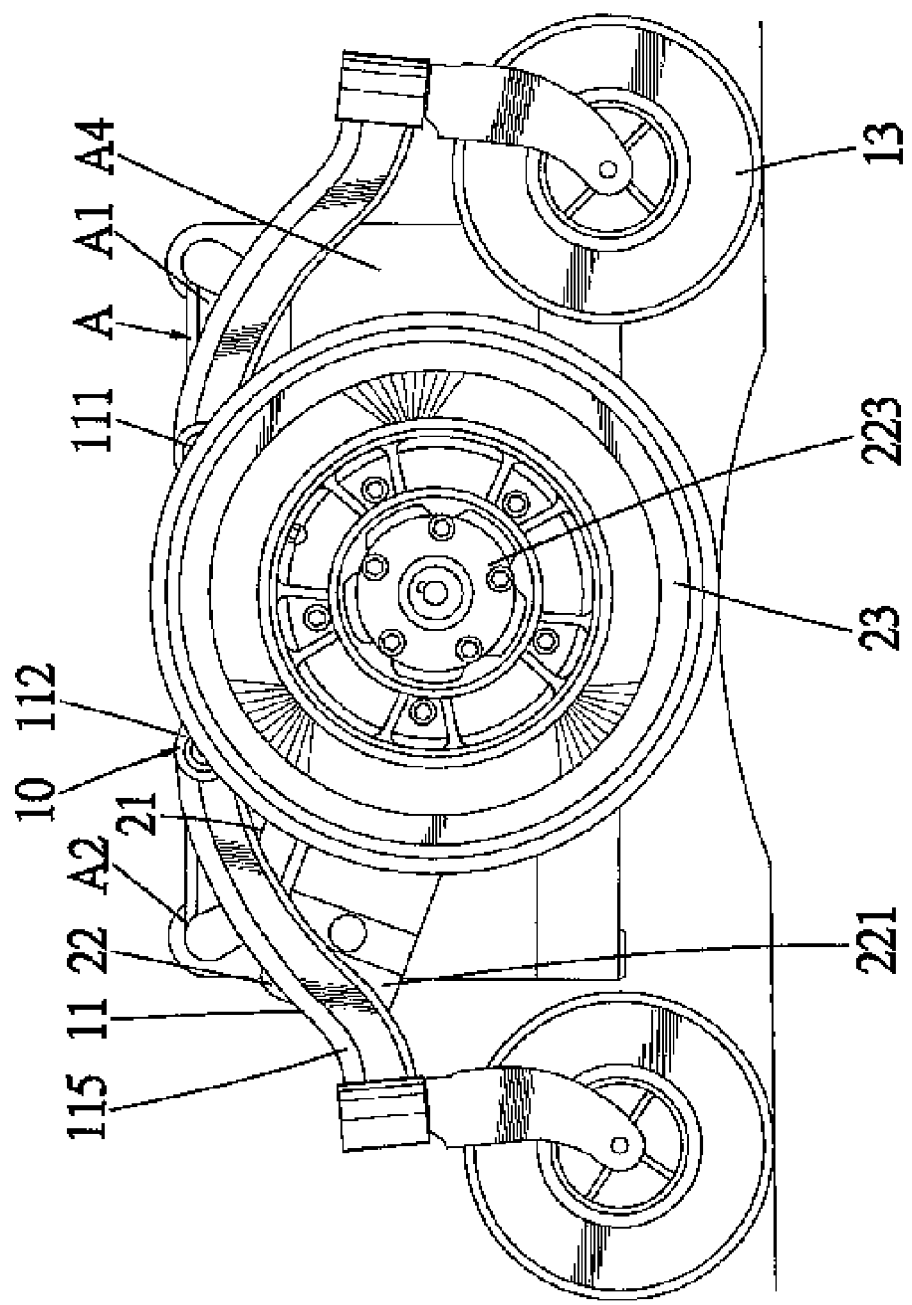
FIG. 7 is a side view of the vehicle shown in FIG. 4 over a bump.

Referring to FIG. 7, the vehicle goes over a bump. The operation of the vehicle over the bump is like a combination of the operation of the vehicle described referring to FIG. 5 with the operation of the vehicle described referring to FIG. 6. When the front caster 13 goes up on the upside of the bump, the wheel 23 maintains its grip of the plain surface. When the front caster 13 goes down on the downside of the bump, the wheel 23 grips the upside of the bump. When the wheel 23 is on the bump, it grips the bump. Because of the spring 25, the casters 13 grip the plain surface.

The present invention has been described via detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A vehicle adaptable to various terrains, the vehicle comprising a frame and two rolling sets, with each of the two rolling sets connected to the frame, wherein each of the two rolling sets comprises:

first and second legs pivotally connected to the frame, with the first and second legs pivotally movable independent of each other, wherein the first and second legs each comprises first and second sections connected to each other, with the first and second sections each having first and second ends, with the second ends of the first and second sections of the first leg connected to each other, with the second ends of the first and second sections of the second leg connected to each other, with the first sections of the first and second legs each defining a slot;

first and second casters, with the first caster connected to the second section of the first leg, with the second caster connected to the second section of the second leg;

a motor connected to the frame;

a pin carried in the frame and extending through the slots of the first and second legs, with the pin having a diameter, wherein lengths of the slots are a multiple times greater than the diameter of the pin, wherein the motor is moved when the first and second legs are pivoted; and a wheel operably connected to the motor, wherein the first and second casters and the wheel grip the ground firmly when the first and second casters go one of an up direction and a down direction.

2. The vehicle according to claim 1 wherein the first section is shorter than the second section.

3. The vehicle according to claim 1 wherein the first section extends from the second section at an obtuse angle.

4. The vehicle according to claim 1 wherein the frame comprises two pivot sets each having first and second pivots, wherein the second ends of the first sections of the first and second legs each define an aperture receiving one of the first and second pivots of one of the first and second legs and pivotally connecting the first and second legs to the frame, with the aperture of the first leg being intermediate the first caster and the slot of the first leg, with the aperture of the second leg being intermediate the second caster and the slot of the second leg.

5. The vehicle according to claim 1 wherein each of the two rolling sets further comprises a support connecting the motor to the frame.

6. The vehicle according to claim 5 wherein the support is movably connected to the frame.

7. The vehicle according to claim 6 wherein the support is pivotally connected to the frame.

8. The vehicle according to claim 7 wherein each of the two rolling sets further comprises a spring installed between the support and the frame.

9. The vehicle according to claim 5 wherein the pin is carried by the support.

10. The vehicle according to claim 9 wherein the support comprises two lugs, wherein the pin extends through the two lugs.

11. The vehicle according to claim 10 wherein each of the first and second legs comprises at least one lug, wherein the slot of the first leg is defined in the at least one lug of the first leg, wherein the slot of the second leg is defined in the at least one lug of the second leg, wherein the at least one lug of the first and second legs are intermediate the two lugs of the support.

12. The vehicle according to claim 11 wherein the at least one lug of the first leg comprises one lug, wherein the at least one lug of the second leg comprises two lugs, with the at least one lug of the first leg intermediate the two lugs of the second leg.

* * * * *